Nov. 19, 1940.     F. M. YOUNG     2,221,891
AIR CONDITIONING DEVICE FOR PASSENGER VEHICLES
Filed Feb. 3, 1937     2 Sheets-Sheet 1

INVENTOR
FRED M. YOUNG
By A. S. Kroh
Attorney

Patented Nov. 19, 1940

2,221,891

UNITED STATES PATENT OFFICE 2,221,891

AIR CONDITIONING DEVICE FOR PASSENGER VEHICLES

Fred M. Young, Racine, Wis.

Application February 3, 1937, Serial No. 123,869

2 Claims. (Cl. 98—2)

The present invention relates to car heaters or air conditioners therefor, of any type, in combination with novel means for circulating heated conditioned or not conditioned air and admittance of the desired quantity of outside air to the device.

Car heaters have been provided with blower fans, the heat being controlled by changing the speed of the fan or by adjusting the air deflectors or by adjusting a thermostat which is usually positioned somewhere within the heater connections.

I provide means whereby the heating or air conditioning may be controlled in the usual manner, in combination with means for controlling the admitted outside air and whereby all or any part of the air moved may be taken from the outside and mixed with recirculated air.

A novel feature of my invention is the by-pass device whereby the air may be recirculated and treated and a certain per cent of outside air added to the recirculated air; thus during cool weather a very small quantity of outside air may be admitted and mixed with the recirculated air and during warm weather the air regulating valve may be changed to a point where all of the circulated air comes from the outside.

Another novel feature of my invention is the filtering means in the outside air inlets, thus to avoid the inconvenience of having dust laden drafts coming in open windows. With my device the interior air may if desired be replaced at frequent intervals by filtered air, the displaced air finding its way out of the inclosure through the small crevices in the doors and windows or on the floor.

To these and other useful ends my invention consists of parts and combinations thereof or their equivalents as described and claimed and shown in the accompanying drawings in which:

Figure 1:
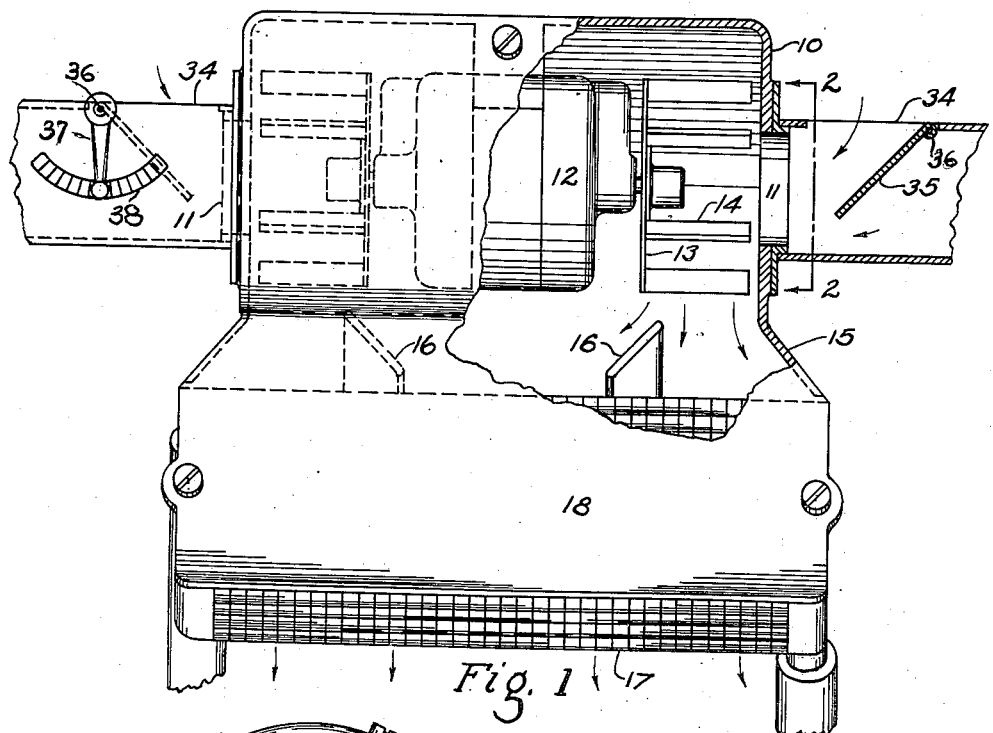
Fig. 1 is a rear elevation of my preferred form of heater partially in section.
Figure 2:
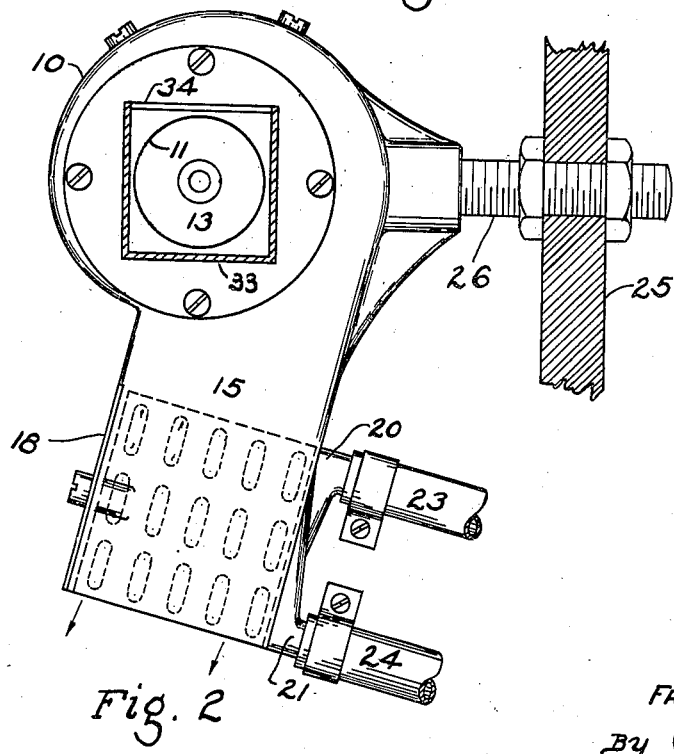
Fig. 2 is a side elevation of the device shown in Figure 1.

In the preferred form of heater or air conditioning unit, the device comprises a housing 10 having inlets at its sides 11—11 and the motor 12 mounted therein. This motor is positioned forward of the housing as illustrated in Figure 2 and its two shaft ends are provided with cage type fans consisting preferably of discs 13, and circumferential vanes 14 for drawing the air through inlets 11—11 and impelling it outwardly and downwardly as indicated by curvilinear arrows in Figures 1 and 2.

I provide a depending casing 15 and mount therein deflectors 16 as illustrated, for diverting some of the air impelled by the rotor through the intermediate portion of radiator core 17, which is mounted in the casing 15 as illustrated. I provide a front plate 18 which is preferably removably attached and forms the front portion of the radiator inclosure whereby the core may be readily inspected or removed from the casing 15. In the design shown members 10 and 15 act to form an elongated unit or housing which when positioned as illustrated the heated air will be discharged downwardly and slightly rearwardly. Member 10 of the housing, it will be noted by scrutinizing Figures 1 and 2, forms a suitable inclosure for the motor and fans so the air will be drawn in at inlets 11 on opposite sides of the housing and near one end thereof and be forced through core 17 and discharged at the other end of the housing; thus the inlets will be spaced a distance from the outlet.

Figure 3:
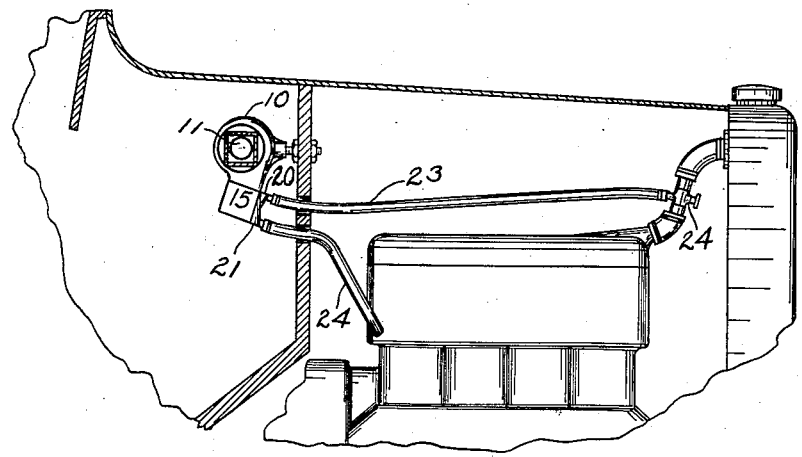
Fig. 3 is a side elevation illustrating the device shown in Figures 1 and 2 as connected to an automobile engine.

In the design shown the core is provided with inlet and outlet fittings 20 and 21 to which the usual hose connections 23 and 24 may be made as indicated in Figure 3, having preferably a thermal valve 24 and means thereon whereby the temperature of the liquid passing through core 17, may be regulated or entirely shut off for summer driving.

Figure 4:
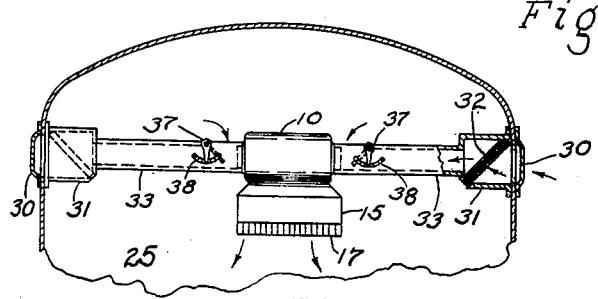
Fig. 4 is a rear view partially in section of my device illustrating the air inlets and their connections to the heater as positioned within the cowl of an automobile, similar to that shown in Figure 3.

I illustrate the heater or conditioning unit as attached to cowl board 25 by means of bolt 26. In Figure 4 I have illustrated the unit as being practically centrally positioned within the car inclosure. This position obviously may be changed either vertically or horizontally.

Figure 5:
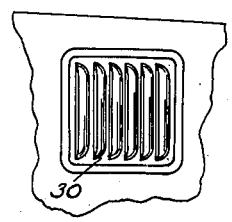
Fig. 5 is a side elevation of the grill inlet.

Thus I have disclosed one form of a car heater which may be installed in the usual way and having air inlets 11—11. I provide preferably at each side of the cowl as indicated in Figures 4 and 5, grilles 30—30 each having a suitable air filter housing 31—31. The filter housing is preferably rectangular in cross section and the filtering element 32 is positioned preferably at an angle of 45° to thereby increase its area. I provide suitable means (not shown) whereby these filtering elements may be removed and cleaned by immersing in thin oil, and replaced as is the custom with air filters of the class.

Figure 6:
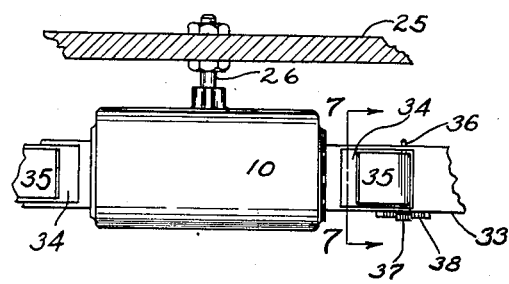
Fig. 6 is a top view of the heater attached to the cowl board as in Figure 3 and illustrating fractionally the positions of the air adjusting valves.
Figure 7:
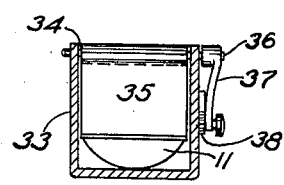
Fig. 7 is an end section taken on line 7—7 of Figure 6.

I provide ducts 33—33 which are secured in any suitable manner to inlets 11 and to filter housings 31. I provide cutaway portions 34—34 adapted to be closed by valve 35 when this valve is positioned horizontally on its axis 36, the axis extending through the side wall of member 33 as indicated and having at its rear ends levers 37 secured thereto as indicated in Figures 4, 6 and 7. These levers are preferably secured to member 36 so they are in a vertical position when valve 35 is half open, as shown by dotted lines in Figures 1 and 4 and by full lines in Figures 6 and 7.

I provide serrated sectors 38—38. The lower end of lever 37 is preferably provided with a spring actuated catch to thereby engage the serrations in sector 38, thus to hold valve 35 in any desired position. Thus it will be seen that by turning lever 37 valve 35 may be moved in a vertical position to thus close the duct and leave the cutaway portion open whereby all of the circulated air will come from within the enclosure; and the valves may be moved so they close inlet 34 whereby all of the circulated air will come from the outside. Various percentages of outside air or recirculated air may be secured by simply moving levers 37 one direction or the other.

An important advantage of my design as illustrated in Figure 4, is brought about by the position of valves 35 which may, if desired, be positioned adjacent filters 31, by reversing or turning end for end ducts 33, thus to more perfectly circulate the air in the enclosure by spacing the inlets farther away from the heater outlet.

During warm weather the core may be made inactive and the full capacity of the fans may be used to move outside air into the enclosure; thus while the fan motor may be used to circulate heated air in the enclosure during cool weather, it may also be used to provide fresh filtered air during warm weather. Clearly a cooling medium may be supplied to core 17 thus to cool the entering or recirculated air.

Having thus shown and described my invention, I claim:

1. A device of the class described, comprising a vehicle of the closed body type having a cowl extension in the forward end thereof, an elongated air circulating and heating unit positioned in said cowl extension, said circulating and heating unit having air inlets on opposite sides and near one end thereof and an air outlet at its other end, grilles in the side panels of said cowl extension, air ducts leading from said air inlets to said grilles, inside air inlets in said ducts having two way valves with means whereby the relative quantity of outside and inside air entering said air circulating and heating unit may be manually regulated.

2. A device as recited in claim 1 including; said air ducts having enlargements therein adjacent said grilles and having filtering pads in said enlargements whereby the outside air entering said air heating device will be filtered.

FRED M. YOUNG.